Figure 2:
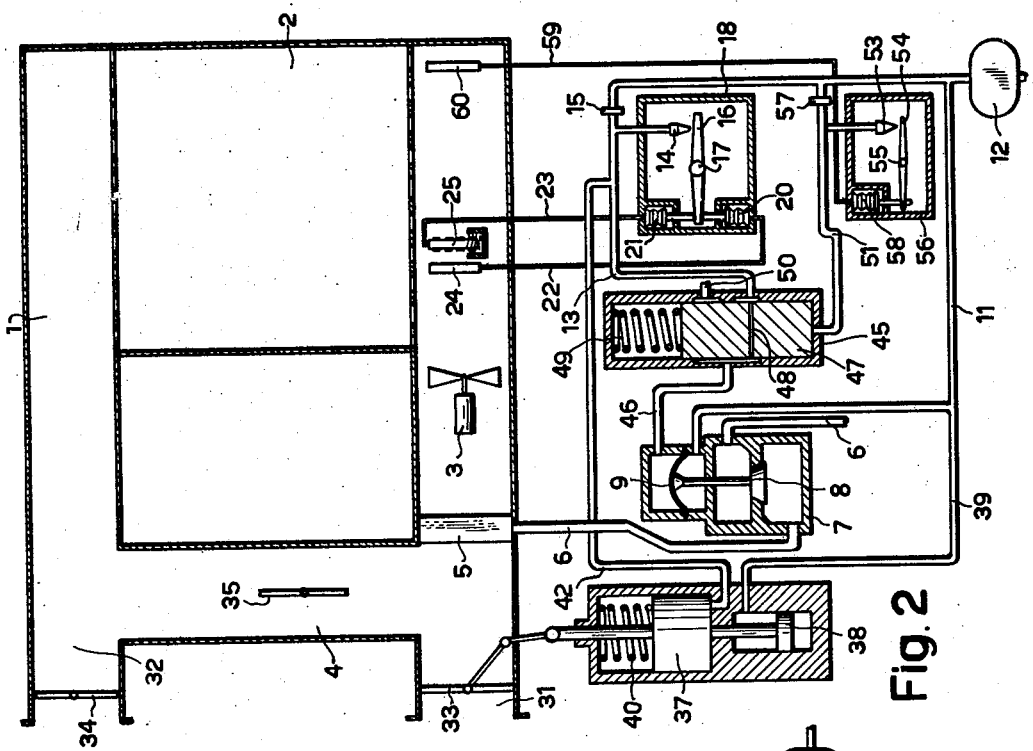

Nov. 12, 1963   W. BERGER   3,110,573
CONTROL MEANS AND METHOD IN A DRIER FOR MACARONI PRODUCTS
Filed March 20, 1959

INVENTOR:
WILHELM BERGER
BY C. P. Goepel
his ATTORNEY

United States Patent Office 3,110,573
Patented Nov. 12, 1963

3,110,573
CONTROL MEANS AND METHOD IN A DRIER FOR MACARONI PRODUCTS
Wilhelm Berger, Paramus, N.J., assignor to Gebrueder Buehler, Uzwil, Switzerland, a Swiss firm
Filed Mar. 20, 1959, Ser. No. 800,765
Claims priority, application Switzerland May 14, 1958
6 Claims. (Cl. 34—30)

The drying of macaroni, spaghetti, noodles and like food-paste products calls for special attention from the operator, since maintenance of the desired condition of the drying air requires continuous adaptations of the heating system and air circulation and/or exhaust air.

Program controllers have the disadvantage that for each product a special drying procedure has to be set up, whereby any inaccuracies which have happened, be that in charging the drier or for any other reason such as a variation of the external climate, continue to be effective during the further drying procedure. In such cases, the program should be changed, and thus the plant has to be constantly supervised. Since too rapid a drying leads to breakage of the goods, by way of precaution a program is set which results in a slower drying than would be permissible at most stages. Thus the capacity of a given drier is not utilized.

A kind of regulation or control could be used in which the relative humidity of the drying air is regulated to a constant value while the goods remain in the final drier. Since the minimum permissible humidity is much higher at the beginning than at the end of the drying operation, the output of the drier remains below the possible maximum for some length of time. In order to eliminate this disadvantage in a batch drier, the ideal or rated value of relative humidity must be changed several times during the drying operation, which however is identical with a program control. In a continuous drier, the number of compartments and of regulators has to be increased. When changing the size of the product, the amount of water given off is varied too in the continuous drier. In this case, the set ideal or rated value of humidity should be changed, which however calls for special knowledge and understanding from the part of the operator.

It has also been tried to regulate the temperature of a dry-bulb and the temperature of a wet-bulb thermometer, but this again would be identical with a program control in the case of static driers, since at the beginning of the drying process the air temperature is raised and afterwards lowered. Further, the regulation is subjected to substantial variations, since the attained value of one of the variable quantities is disturbed by the correction of the other variable quantity.

The invention discloses means for avoiding said disadvantages and relates, on one hand, to a method for regulating a drier for macaroni products, which is characterized in that during the presence of the goods in a drier compartment the psychrometric temperature difference is regulated to a constant value through action on the heating unit for the drying air.

The invention, furthermore, relates to means for carrying out said method, which are characterized by a psychrometric difference regulator disposed in a drier for macaroni products, the temperature-sensing elements of this regulator being situated in the drying air and the regulator part being connected to the unit for heating the drying air, the output of said heating unit being increased when the psychrometric temperature difference is decreased.

Figure 1:
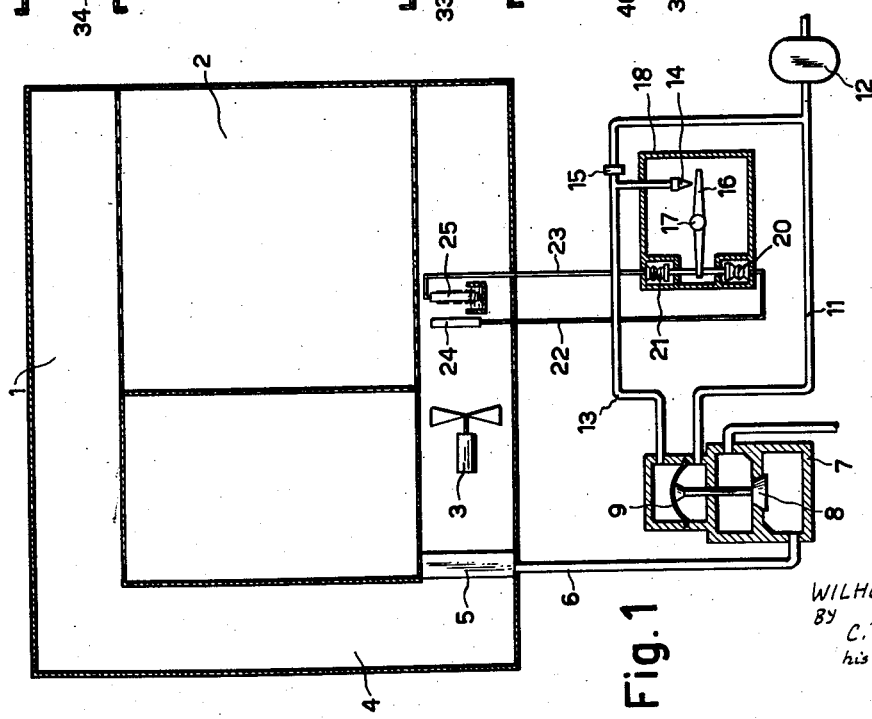

Two forms of the invention are shown in the drawings as applied to a static drier. FIG. 1 shows a regulator without limitation of the upper temperature, and FIG. 2 shows a regulator with regulation of the upper temperature limit and of the fresh air supply.

The static drier 1 (FIG. 1) comprises a drying chamber 2 for the macaroni or the like. The drying air is circulated in chamber 2 and through duct 4 by a fan 3. In the latter is disposed a heating unit 5 which is supplied with a heating agent such as steam through a conduit 6 in which is disposed a throttle valve 7. The valve element 8 of valve 7 is secured to a membrane 9. The latter is subjected on one side to the pressure in a conduit 11 which is directly connected to a compressor 12. On the other side, membrane 9 is subjected to the pressure in a conduit 13 which communicates with compressor 12 and has a nozzle 14 adapted to operate as a discharge nozzle for reducing the pressure in conduit 13. In the position shown, the force arising from the deformation of membrane 9 is in equilibrium with the force produced by the pressure in conduit 11 since, as will be more clearly pointed out hereinafter, conduit 13 is relieved to atmosphere via nozzle 14. A throttle 15 in conduit 13 between compressor 12 and nozzle 14 prevents the pressure drop caused by open nozzle 14 from affecting compressor 12.

The air discharge from nozzle 14 is controllable by means of a lever 16 which is pivoted at 17 to the casing of a psychrometric difference regulator 18. At its other end, lever 16 moves under the influence of the volumetric changes of two bellows 20, 21 which communicate with the thermometric liquid in a dry-bulb thermometer 24 and in a wet-bulb thermometer 25 respectively, via capillary conduits 22 and 23 respectively.

In operation of the apparatus, the goods are inserted into chamber 2. They, for example, may be spaghetti which after extrusion have already been treated for a certain length of time, e.g., half an hour, in another drying chamber and which remain in drier 1 until they have reached the desired degree of drying, for example for 10 to 20 hours, according to their size.

The goods give off water increasing the moisture content of the air in chamber 2 and duct 4 and decreasing the psychrometric temperature difference. As the moisture content of the air increases, the temperature of the wet-bulb thermometer 25 approaches that of the dry-bulb thermometer 24. Bellows 20, 21 and lever 16 are preset to hold nozzle 14 open at a fixed temperature differential. As the temperature differential decreases, bellows 20, 21 are moved out of balance causing lever 16 to shut nozzle 14. The pressure in conduit 13 thus rises. Under this increased pressure, membrane 9 moves to open valve 7. The smaller the psychrometric temperature difference, the higher the pressure in conduit 13 and the greater the degree of opening of valve 7 and the output of heating unit 5.

As the drying progresses, the quantity of water given off by the goods in the unit of time is decreased and the psychrometric temperature difference is increased. Lever 16 allows of a greater discharge from nozzle 14, and valve 7 closes more and more until the ideal or fixed psychrometric temperature difference is reached, whereupon heating unit 5 is stopped. If desired, the unit 5 still may be left in operation with a small output when the condition corresponds to the fixed differential. In such a case, said unit is stopped entirely only when the fixed differential is exceeded. Drier 1 begins to cool off through heat losses, but usually the psychrometric temperature difference does not fall, since sufficient cool air may flow through leaky spots or fresh-air openings (not shown) provided for this purpose, into drier 1 to replace the moist warm air. Should cooling be too rapid, then the psychrometric temperature difference would drop, since the cooler air can take up less water. In such case however, the psychrometric difference regulator 18 is active to put heating unit 5 in operation in the manner described above, until the desired psychrometric temperature difference is restored.

Psychrometric temperature regulation has the advantage that the goods can stand approximately the same psychrometric temperature difference at the beginning and at the end of their presence in drier 1, for example 4° C. Heating unit 5 thus allows of attaining the maximum permissible heating power and thereby a minimum time for drying.

In the embodiment of FIG. 2 parts and portions identical to those in the first example (FIG. 1) have the same reference numbers 1 to 25. The circulating-air duct 4 is provided with conduits 31, 32 for the supply of fresh air and the discharge of humid drying air respectively. The conduits 4, 31, 32 are each provided with a throttling device consisting of butterfly valves 33, 34 and 35 which are interconnected, by means not shown such as by sprockets on the shafts of the respective butterfly valves interconnected by continuous chains, or by any other similar or known mechanical linkage, so that the valves 33, 34 are closed simultaneously while valve 35 is opened, and vice versa.

Valve 33 is actuated by a piston 37 which normally is held in a position corresponding to the closed position of valve 33, by means of a smaller piston 38 and a spring 40. The chamber of piston 37 communicates with a conduit 42 and conduit 13.

A relay 45 and a conduit 46 are disposed between conduit 13 and valve 7. Relay 45 comprises a slider or piston 47 having a diametral passage 48. In the position shown of piston 47 which is loaded by a spring 49, passage 48 connects conduit 13 to conduit 46 and valve 7. Piston 47 further is subjected to the pressure in a conduit 51. When this pressure is high enough, passage 48 connects valve 7 and conduit 46 to an exhaust air line 50.

Conduit 51 is connected to compressor 12 and comprises a nozzle 53 of which the discharge is controlled by a lever 54. The latter at 55 is fulcrumed to the thermometric regulator 56, and its other end is connected to the bellows 58 which through a capillary conduit 59 communicates with the thermometric liquid in a thermometric dry bulb 60. With rising temperature, lever 54 decreases the discharge from nozzle 53, and the pressure in conduit 51 is raised. A throttle 57 is inserted before nozzle 53.

At the beginning of the drying process, the function of embodiment shown in FIG. 2 is the same as in the example illustrated in FIG. 1. When the psychrometric temperature difference is only slightly below the pre-set or fixed value, membrane 9 is actuated, partially opening valve 7, and heating unit 5 is only partially operative. When the psychrometric temperature difference is further decreased, valve 7 is fully opened, until the heating unit 5 is fully cut in. When the psychrometric difference of temperature drops still further, the pressure in the conduits 13 and 42 rises further. Valve 7 remains further open, piston 37 overcomes the resistance of piston 38 and begins to open the valves 33, 34 and to close valve 35. Thereby fresh air is sucked through duct 31, and moist air is blown out through duct 32. This fresh air contains less water than the air which already is in the drier, thus enhancing the effect of heating unit 5 for increasing the psychrometric difference of temperature. If desired, the valves 33, 34 may be opened before heating unit 5 is in full operation.

When the temperature of the drying air reaches a preset value, the thermometric liquid of thermometer bulb 60 via bellows 58 acts on to lever 54 which reduces the discharge from nozzle 53 so much that pressure in conduit 51 moves piston 47 against the force of spring 49 until valve 7 and conduit 46 are connected to the exhaust air line 50. Thereby the pressure on the upper side of membrane 9 drops to zero, valve 7 is closed, and heating unit 5 is cut out. The thermometric regulator 56 causes the temperature of the drying air to oscillate in the vicinity of the pre-set value until the water loss of the goods is so much reduced that cooling may take place as in the arrangement shown in FIG. 1.

The arrangement according to FIG. 2 ensures that the goods never are exposed to any excessive temperature.

The invention, of course, is not restricted to the two embodiments shown and described but may be applied equally well to continuous driers. In the latter, it allows bridging interruptions in production without risk. At the end of a working period, the goods may readily be dried completely in a static way and manner, which in other systems of regulation would require a program control.

What I claim as new and desire to secure by Letters Patent, is:

1. A method for controlling a drier for drying macaroni and similar food paste products, the steps comprising determining the moisture content of the drying air in said drier by continuously measuring the wet and dry bulb temperatures of the drying air and, as a function of the difference in wet and dry bulb temperatures, regulating the drying capacity of said drying air to increase the drying capacity as said difference in wet and dry bulb temperatures decreases and to decrease the drying capacity as said difference in wet and dry bulb temperatures increases.

2. In a drier for drying macaroni and similar food products comprising a drying chamber, a drying zone in said chamber, means for circulating air through said drying zone, means for heating said air, means for delivering air from outside of said drying chamber to said circulating means, a throttle in said air delivery means, means for measuring the psychrometric difference in said drying chamber intermediate said circulating means and said drying zone, means for regulating said heating means, and means interconnecting said psychrometric measuring means, said regulating means and said throttle whereby, as the psychrometric difference of the air in said drying chamber decreases, said throttle is opened and the capacity of the drying air in said drying chamber to hold water is increased.

3. In a drier as recited in claim 2 including means for opening said throttle when the psychrometric temperature difference falls below a pre-set value.

4. In a device as recited in claim 3 including means for opening said throttle when said regulating means is fully opened.

5. A method as recited in claim 1 in which the drying capacity of said drying air is increased by heating said drying air.

6. A method for controlling a drier for drying macaroni and similar food paste products, the steps comprising determining the moisture content of the drying air in said drier by continuously measuring the wet and dry bulb temperatures of the drying air and, as a function of the difference in wet and dry bulb temperatures, regulating the drying capacity of said drying air by heating said drying air to increase the drying capacity as said difference in wet and dry bulb temperatures decreases and to decrease the drying capacity of said drying air by decreasing the heating of said drying air as said difference in wet and dry bulb temperatures increases and, when the dry bulb temperature reaches a predetermined maximum value, discontinuing the heating of said drying air.

References Cited in the file of this patent

UNITED STATES PATENTS

| | | |
|---|---|---|
| 1,263,484 | Thompson | Apr. 23, 1918 |
| 1,393,086 | Carrier | Oct. 11, 1921 |
| 1,711,574 | Miller | May 7, 1929 |
| 2,257,916 | Polythress | Oct. 7, 1941 |
| 2,320,474 | Ross | June 1, 1943 |
| 2,328,974 | Guler | Sept. 7, 1943 |
| 2,440,648 | Walter et al. | Apr. 27, 1948 |
| 2,790,250 | Giroud | Apr. 30, 1957 |
| 2,935,009 | Cloud | May 3, 1960 |